No. 719,452. PATENTED FEB. 3, 1903.
J. S. FOX.
TROLLEY SYSTEM FOR ELECTRIC RAILWAYS.
APPLICATION FILED JUNE 28, 1902.
NO MODEL. 4 SHEETS—SHEET 1.
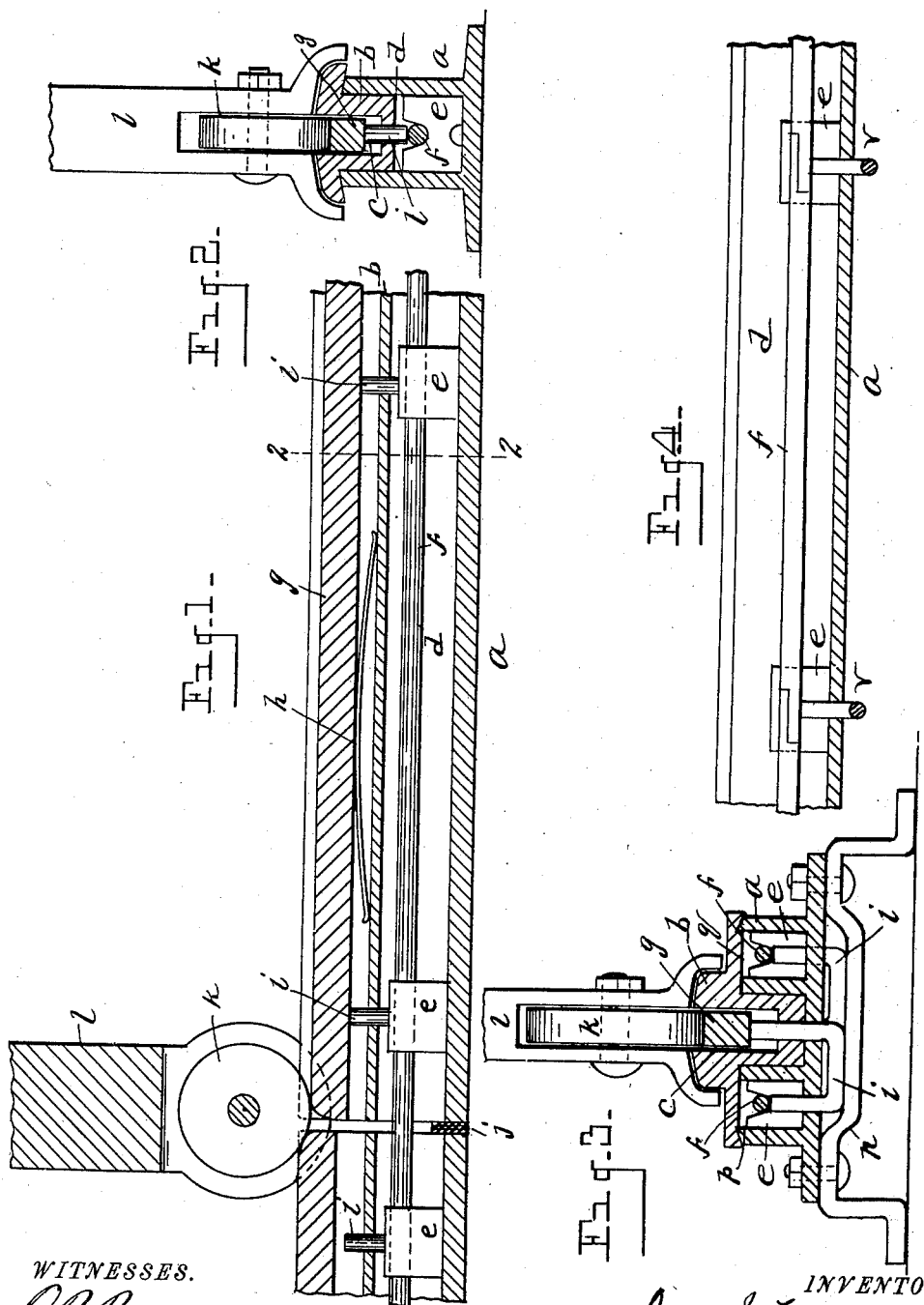
WITNESSES.
INVENTOR.
James S. Fox
By Newell S. Wright
His Attorney No. 719,452. PATENTED FEB. 3, 1903.
J. S. FOX.
TROLLEY SYSTEM FOR ELECTRIC RAILWAYS.
APPLICATION FILED JUNE 28, 1902.
NO MODEL. 4 SHEETS—SHEET 2.
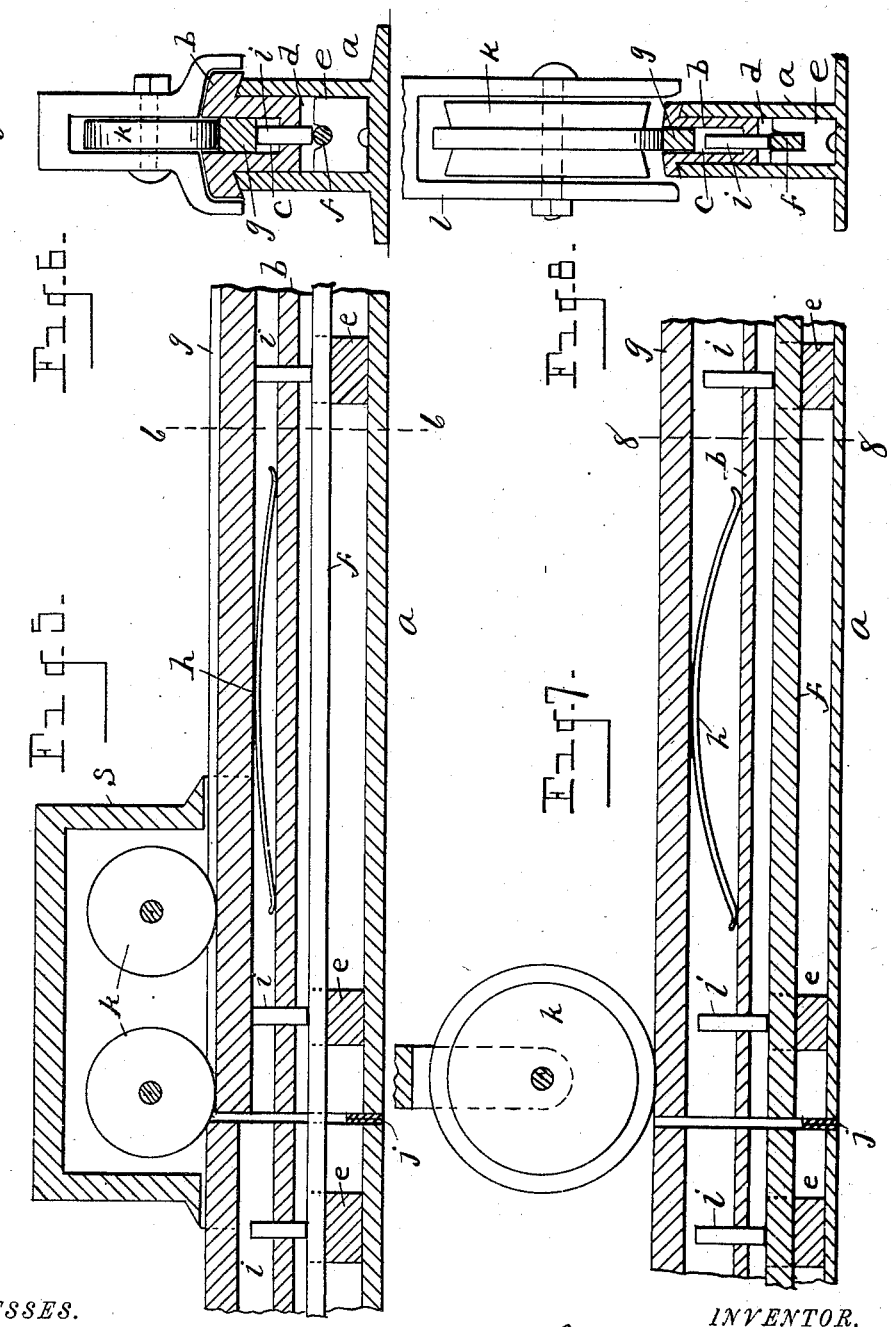
WITNESSES.
O. B. Baenziger
J. M. Poland
INVENTOR.
James S. Fox
By Newell S. Wright
his Attorney No. 719,452. PATENTED FEB. 3, 1903.
J. S. FOX.
TROLLEY SYSTEM FOR ELECTRIC RAILWAYS.
APPLICATION FILED JUNE 28, 1902.
NO MODEL. 4 SHEETS—SHEET 3.
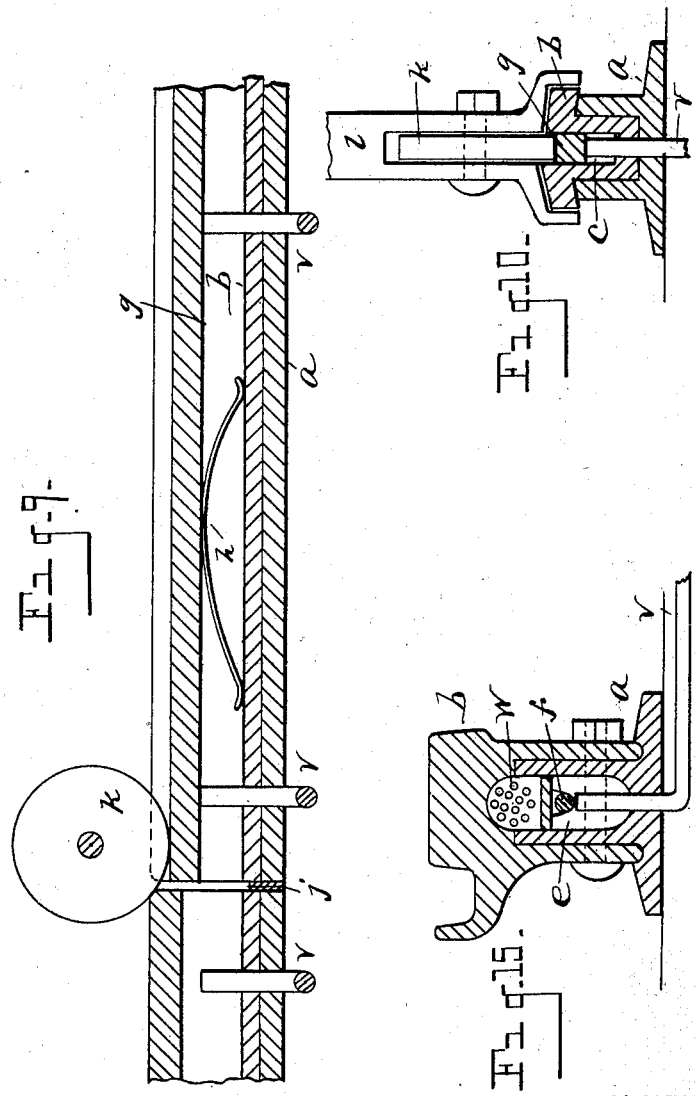
WITNESSES.
O. B. Baenziger
J. M. Poland.
INVENTOR.
James S. Fox
By Newell S. Wright
his Attorney

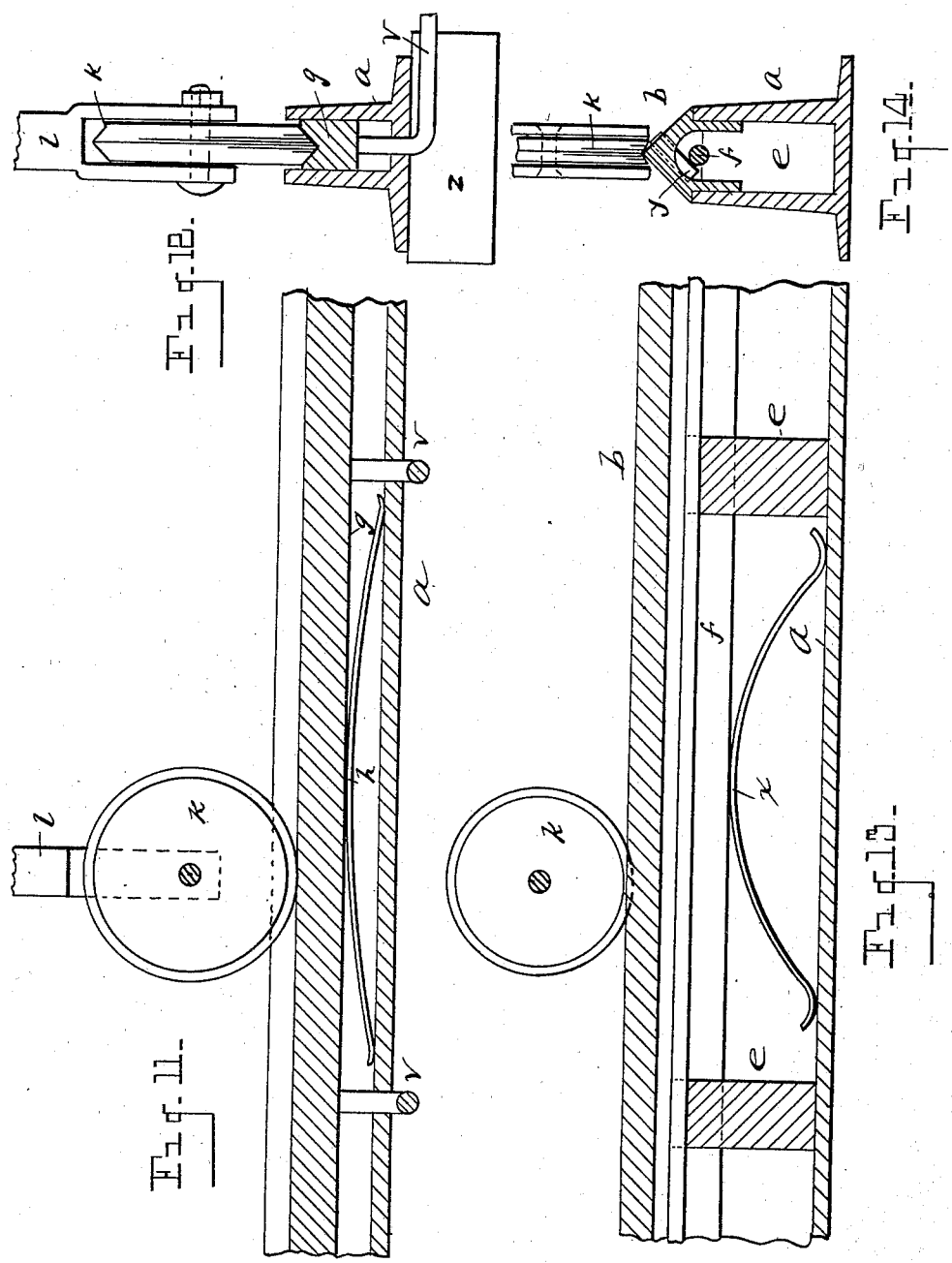

UNITED STATES PATENT OFFICE.

JAMES S. FOX, OF JACKSON, MICHIGAN.

TROLLEY SYSTEM FOR ELECTRIC RAILWAYS.

SPECIFICATION forming part of Letters Patent No. 719,452, dated February 3, 1903.

Application filed June 28, 1902. Serial No. 113,583. (No model.)

*To all whom it may concern:*

Be it known that I, JAMES S. FOX, a subject of the King of Great Britain, residing at Jackson, county of Jackson, State of Michigan, have invented a certain new and useful Improvement in Trolley Systems for Electric Railways, of which the following is a specification, reference being had to the accompanying drawings, which form a part thereof.

This invention has for its object an improved trolley system for electric railways; and it consists of the construction, combination, and arrangement of devices hereinafter specified and claimed, and illustrated in the accompanying drawings, in which—

Figure 1 is a view in longitudinal section. Fig. 2 is a view in cross-section on the line 2 2, Fig. 1. Fig. 3 is a view in cross-section, illustrating a modification. Fig. 4 is a view in longitudinal section, showing a modification. Fig. 5 is a view in longitudinal section, showing parts in elevation. Fig. 6 is a view in cross-section on the line 6 6, Fig. 5. Fig. 7 is a view in longitudinal section, showing the trolley-conductor formed of a metal bar. Fig. 8 is a view in cross-section on the line 8 8, Fig. 7. Fig. 9 is a view in cross-section, illustrating a modification. Fig. 10 is a view in cross-section. Fig. 11 is a view in longitudinal section, showing parts in elevation. Fig. 12 is a cross-section thereof. Fig. 13 is a view in longitudinal section, showing a modification in the construction of the rail. Fig. 14 is a cross-section thereof. Fig. 15 is an additional view in cross-section.

More particularly this invention is intended to provide a surface rail for carrying a trolley-conductor for electric railways, and more especially a third surface rail to be laid upon the ordinary ties, dispensing with an overhead trolley-wire, the trolley-wheel or similar device being connected at the bottom of an electric car, the invention as so applied avoiding the necessity of a drainage-conduit or underground location, as well as overhead systems, although the invention might be used in some of its features in underground conduits where such conduits already exist.

While the invention is susceptible of various modifications in details of construction, some of which are shown herewith, the fundamental ideas consist of a railway-rail to carry a trolley-conductor, the rail being out of electrical circuit except when a car bears thereupon, a yielding device being employed to bring a trolley-conductor into circuit.

In carrying out the invention a third rail is shown in the drawings formed of two parts, a lower channeled base $a$, provided with flanges whereby it may be spiked to the ties in the usual manner, and an upper portion or cap $b$, the two parts the one lapping over the other. The cap is recessed on its upper surface, as shown at $c$, the sides of the cap preferably extending over the upper edges of the base portion. The base is formed with a chamber $d$ below the cap, in which are located insulators $e$, carrying a trolley-conductor $f$. The rails may be made of any desired length. Within the recess of the cap is located a track $g$, running longitudinally of the rail, said track being supported upon one or more springs $h$, whereby the track is normally elevated, allowing the track to be depressed when the pressure of a trolley-wheel or similar device is exerted thereupon. To form electric contact between the track and the conductor, a contact-post $i$ is employed, resting at its lower end upon the conductor, the track contacting with the post when depressed. As soon as the pressure is relieved from the track the springs therebeneath elevate it out of contact with the post, breaking the electric circuit, rendering the track and the rail perfectly safe. The rails at their adjacent ends are insulated the one from the other, as shown at $j$, and are preferably beveled on their adjacent upper surfaces to prevent injury by and to the car-wheels in passing thereover. The lower portion of the cap is perforated to allow the passage of the post therethrough.

A trolley-wheel is indicated at $k$ and its arm at $l$, carried by a car. (Not shown.)

The trolley-conductor may have the customary return-circuit. The springs, it will be seen, rest upon the bottom portion of the cap.

In Fig. 3 is shown a modification wherein provision is made for carrying several electrical conductors. In this case the contact-posts $i$ are preferably made U-shaped, with the adjacent ends of which the track contacts when depressed, the opposite ends of said posts being in contact with corresponding trolley-conductors. In this case the base of the rail is provided, preferably, with plural chambers, as the chambers $p$ $q$, to carry the conductors. A support n may also be provided underneath the rail and underneath the U-shaped posts. The lower portion of the cap may in this instance also extend to the bottom of the base. Instead of supporting the trolley-wheel by an intervening arm to the car a shoe s may be employed attached to the car provided with trolley-wheels.

Instead of a trolley copper wire, as shown in Fig. 1, for example, bars of suitable metal might be employed, as shown in Figs. 4, 7, and 8, the adjacent ends of said bars overlapping.

Instead of having the trolley-conductor carried by a third rail one of the track-rails might be constructed to carry the conductor, the same as shown in Fig. 15, the track-rail being made of two parts, the one overlapping and entering the other, the two portions constructed in a manner similar to the third rail heretofore described, except that the upper portion of the rail is made heavier and is grooved to receive the flange of the car-wheels. In this case, moreover, the upper portion of the rail overlaps the lower and has its lower extremities resting upon the flanges of the lower portion. Where the trolley-conductor is carried by one of the track-rails, an additional conductor v leads from the trolley-conductor to the spring-actuated track of the third rail, the third rail still being employed to carry the yielding track. Where one of the side rails is constructed to carry the conductor, it may also be readily constructed with a tubular device w to carry one or more cables. The third rail when the conductor is carried to one of the side rails will not be provided with insulators, the bottom of the lower portion of the rail being also perforated to allow the passage therethrough of the conductor v to form contact with the track when the track is depressed. Where the insulators are omitted in the third rail, the base may be formed without the chamber d, the two parts of the rail being constructed of less height, the third rail being always employed.

Where conduits already exist, the main feature of the third rail may be applied therein; but in this instance the cap b of the rail may at the same time constitute the track, one or more springs x being located underneath the cap to normally elevate the cap out of contact with the conductor. The cap may be provided with one or more contact-pins y to form contact with the conductor when the cap is depressed. So, also, the cap of the rail might be dispensed with, as indicated in Figs. 11 and 12, the track g being supported on one or more springs carried within the chamber of the lower portion of the rail. In Fig. 12 a support z is shown between the tie and the third rail.

Certain features in the construction of the rail hereinbefore described constitute the subject-matter of a separate application filed of even date herewith, Serial No. 113,584.

Where the main track-rail carries the conductor and a third rail the contact-track, the cap need not be recessed upon its upper surface.

Where a rail for plural chambers for carrying plural conductors is used, provision is made for any required amount of electrical power.

What I claim as my invention is—

1. The combination of a surface rail, an electric conductor carried by said rail, a yielding track normally out of electrical connection with said conductor and means to electrically connect the track and the conductor when the track is in depressed position, said track and rail being out of electrical circuit when the track is in normal position, the ends of the rails being insulated one from another.

2. The combination with a rail constructed with plural chambers of a recessed cap over said chambers, insulated electrical conductors in said chambers respectively, a yielding track carried in the recess of said cap, and means to make electrical connection between the track and each of said conductors when the cap is depressed.

3. The combination of a series of rails insulated at their adjacent ends each embodying a channeled base and a recessed cap, an electrical conductor carried by said base, a series of yielding tracks insulated at their adjacent ends carried within the recesses of the corresponding caps and means whereby each track may have electrical connection with said conductor when in depressed condition whereby any given track may be out of electrical circuit when in normal position, said track adapted to be engaged by a moving conductor.

4. In combination a series of rails insulated at adjacent ends each provided with a channeled base formed with a chamber and adapted to be secured to a railway-tie, an electrical conductor in said chamber, a recessed cap, a yielding device carried in the recess of the cap, and contact device whereby the yielding device will form electrical connection with said conductor when the yielding device is in depressed position.

5. In combination a series of surface rails insulated at adjacent ends each provided with a channeled base formed with a chamber, a removable recessed cap, a yielding track in said cap, and a device whereby said track will have electrical connection with said conductor when the track is in depressed position and whereby the track will be out of the circuit when in normal position.

In testimony whereof I have signed this specification in the presence of two subscribing witnesses.

JAMES S. FOX.

Witnesses:
N. S. WRIGHT,
J. M. POLAND.